US012685304B1

(12) United States Patent
    Sutliff

(10) Patent No.:     US 12,685,304 B1
(45) Date of Patent:          Jul. 21, 2026

(54) MODULAR BEAR OR OTHER WILD ANIMAL DETERRENT SYSTEM FOR A HOUSE OR BUILDING

(71) Applicant: Russell Sutliff, Granite Bay, CA (US)

(72) Inventor: Russell Sutliff, Granite Bay, CA (US)

( * ) Notice:     Subject to any disclaimer, the term of this patent is extended or adjusted under 35 U.S.C. 154(b) by 0 days.

(21) Appl. No.: 19/542,978

(22) Filed:     Feb. 18, 2026

(51) Int. Cl.
    A01M 29/24          (2011.01)
(52) U.S. Cl.
    CPC ................................... A01M 29/24 (2013.01)
(58) Field of Classification Search
    CPC .................................................... A01M 29/24
    See application file for complete search history.

(56)                References Cited

U.S. PATENT DOCUMENTS

2006/0279093 A1*  12/2006  Tang ..................... E05C 17/166
                                                                    292/288

2009/0179759 A1*  7/2009  Koury ................. A01M 31/002
                                                                    340/557

* cited by examiner

*Primary Examiner* — Adolf D Berhane
(74) *Attorney, Agent, or Firm* — Craig A. Simmermon

(57)                ABSTRACT

Modular bear or other wild animal deterrent system for a house or building is a deterrent system that uses electrical shock delivery as the deterrent mechanism wherein one or more special strips are mounted to one or more doors or windows of a house or building wherein each special strip dispatches a non-deadly electrical shock to an animal when the animal touches or contacts the special strip. Each special strip has one or more exposed electrically charged wires on the upper surface that render a non-deadly electric shock upon contact therewith. The components of the modular bear or other wild animal deterrent system for a house or building are modular wherein any combination of special strips, special transfer wires, and/or special jumper wires may be easily and quickly assembled and installed on a house or building without the use of any tools.

3 Claims, 9 Drawing Sheets

MODULAR BEAR OR OTHER WILD ANIMAL DETERRENT SYSTEM FOR A HOUSE OR BUILDING

BACKGROUND OF THE INVENTION

1. Field of the Invention

This invention relates to a modular bear or other wild animal deterrent system for a house or building and more specifically to a deterrent system that uses electrical shock delivery as the deterrent mechanism wherein one or more special strips are mounted to one or more doors or windows of a house or building wherein each special strip dispatches a non-deadly electrical shock to an animal when the animal touches or contacts the special strip. Each special strip has one or more exposed electrically charged wires on the upper surface that render a non-deadly electric shock upon contact therewith. Each end of the exposed electrically charged wires is fitted with a special electrical connector that is easily reversibly connectable to: other special strips, special transfer wires, or special jumper wires. Special strips, special transfer wires, and special jumper wires come in various lengths. The components of the modular bear or other wild animal deterrent system for a house or building are modular wherein any combination of special strips, special transfer wires, and/or special jumper wires may be easily and quickly assembled and installed on a house or building without the use of any tools.

2. Description of Related Art

There are other bear and animal deterrent systems that use a non-deadly electrical shock deterrent mechanism in the prior art. However, none disclose a system of special strips, special transfer wires, and special jumper wires as shown and described below wherein one or more special strips is easily and quickly installed on one or more doors or windows of a house or building without requiring any tools, wherein each special strip has a rigid base layer with one or more exposed wires on the upper surface that render a non-deadly electrical shock to an animal upon contact, and wherein, each of the exposed wires on the special strip is fitted with a special electrical connector that easily reversibly connectable to other special strips, other special transfer wires, or other special jumper wires. In some embodiments, each special strip has: a rigid base layer, an adhesive layer, and a release liner on the bottom of the strip, wherein each special strip may be easily and quickly attached and installed on a door or window without the need for any tools or any modification of the door or window. The system is modular wherein any number special strips, in any length, along with any number of special transfer wires or special jumper wires, in any length, may be used to easily and quickly install a deterrent system onto a house of building with the need to use any tools.

BRIEF SUMMARY OF THE INVENTION

It is an aspect of modular bear or other wild animal modular deterrent system for a house or building to be a bear deterrent system or other wild animal deterrent system to protect a house or building from entry by a bear or other wild animal.

It is an aspect of modular bear or other wild animal modular deterrent system for a house or building to protect a house or a building from damage caused by a bear or other wild animal.

It is an aspect of modular bear or other wild animal modular deterrent system for a house or building to be modular wherein any number of different elements or modules of a system may be easily connected together and installed on a house or building.

It is an aspect of modular bear or other wild animal modular deterrent system for a house or building to have: two or more one-wire special strips; one or more two-wire special strips; or two or more one-wire special strips and one or more two-wire special strips.

It is an aspect of modular bear or other wild animal modular deterrent system for a house or building to cause an electrical shock to a bear or other wild animal upon making contact with two one-wire special strips or one two-wire special strips.

In is an aspect of each one-wire special strip include: a base layer and a first exposed wire with electrical connectors on each end.

In is an aspect of each two-wire special strip include: a base layer; a first exposed wire with electrical connectors on each end; and a second exposed wire with electrical connectors on each end.

It is an optional aspect of each base layer of each one-wire special strip and each two-wire special strip to include an adhesive layer and a release liner.

It is an aspect of modular bear or other wild animal modular deterrent system for a house or building to have a power supply unit.

It is an aspect of power supply unit to supply an electrical shock or an electrical pulse signal.

It is an aspect of modular bear or other wild animal modular deterrent system for a house or building to have all one-wire special strips and/or all two-wire special strips electromechanically connected to the power supply unit to form an electrical circuit there with.

It is an aspect of modular bear or other wild animal modular deterrent system for a house or building to have a first jumper wire or a first transfer wire, with electrical connectors on each end of the wires.

It is an aspect of modular bear or other wild animal modular deterrent system for a house or building to have a second jumper wire or a second transfer wire, with electrical connectors on each end of the wires.

It is an aspect of modular bear or other wild animal modular deterrent system for a house or building to be modular, wherein, all one-wire special strips, all two-wire special strips, all jumper wires, and/or all transfer wires may be electromechanically connected together and installed on a house or building without the use of any tools. This means that any and all components of the deterrent system may be electromechanically connected together and installed on a house or building without the use of any tools.

DEFINITION LIST

Figure 1:
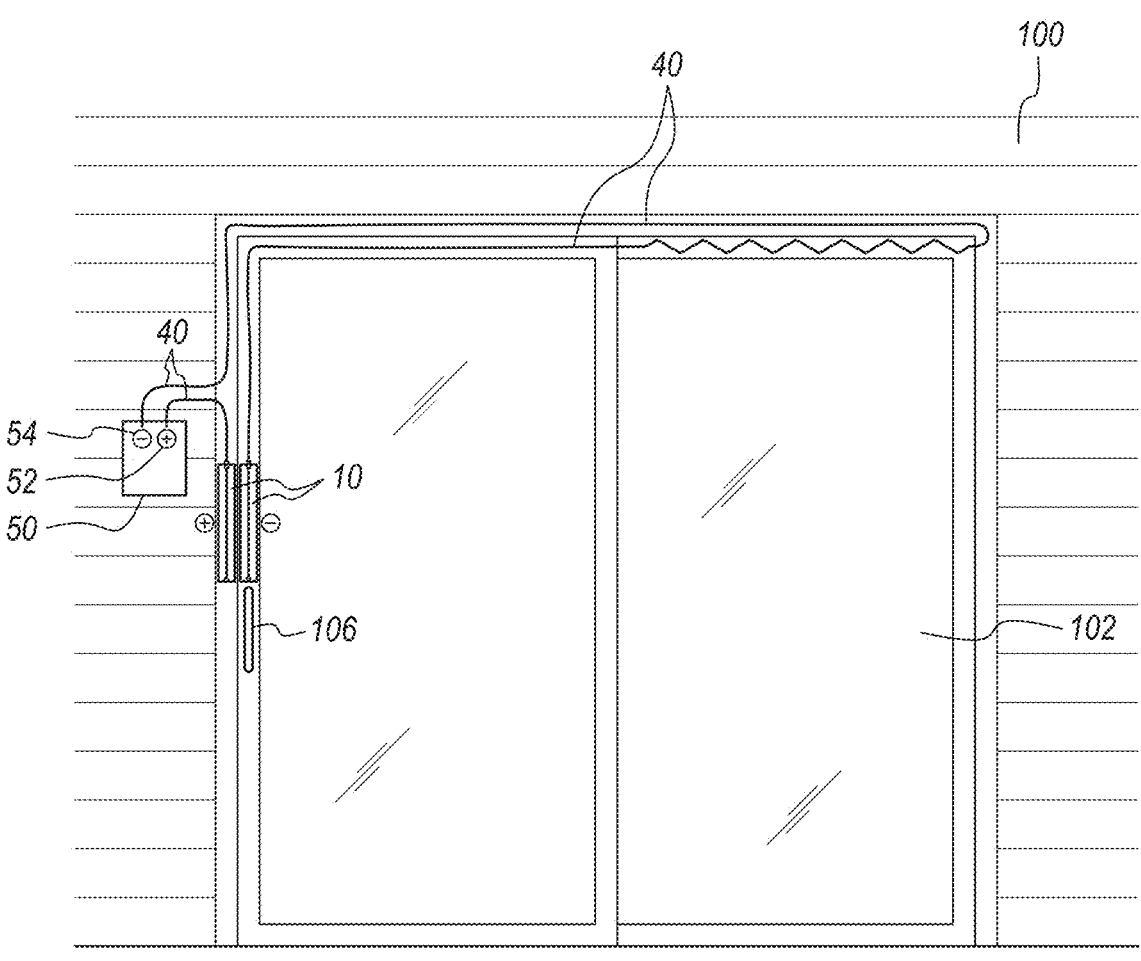
FIG. 1 is a view of a deterrent system with two one-wire special strips installed around the breech of a sliding door. This deterrent system uses a length of corrugated jumper wire to allow the sliding door to open and close without the need to take down wiring and reinstalling wiring in order to open and close the sliding door.

| Term | Definition |
| --- | --- |
| 5 | Bear or Other Wild Animal Modular Deterrent System for a House or Building |
| 10 | One-Wire Special Strip |
| 12 | Base Layer |
| 14 | First Exposed Wire |
| 16 | First Electrical Connector on First Exposed Wire |
| 18 | Second Electrical Connector on First Exposed Wire |
| 20 | Two-Wire Special Strip |
| 24 | Second Exposed Wire |
| 26 | First Electrical Connector on Second Exposed Wire |
| 28 | Second Electrical Connector on Second Exposed Wire |
| 30 | Adhesive Layer |
| 32 | Release Liner |
| 40 | Jumper Wire |
| 42 | First Electrical Connector on Jumper Wire |
| 44 | Second Electrical Connector on Jumper Wire |
| 50 | Transfer Wire |
| 52 | First Electrical Connector on Transfer Wire |
| 54 | Second Electrical Connector on Transfer Wire |
| 56 | Corrugated Segment of Transfer Wire |
| 60 | Power Supply Unit |
| 62 | Positive or Hot Terminal |
| 64 | Negative or Neutral Terminal |
| 100 | Exterior Wall of House of Building |
| 102 | Sliding Door or Patio Door |
| 104 | Hinged Door |
| 106 | Door Handle |
| 108 | Window |
| 110 | Shelf on Exterior Wall of House or Building |
| 112 | Bait with Bear Appealing Odor |
| 120 | Bear or Other Wild Animal |

DETAILED DESCRIPTION OF THE INVENTION

Modular bear or other wild animal deterrent system for a house or building 5 is essentially an all-you-need kit to quickly install a bear deterrent system onto a house or building to very effectively repel all bears from your house or building without the bear causing any damage to your house or building and without harming the bear. The modular bear or other wild animal deterrent system for a house or building 5 uses a nonlethal electrical shock to deter bears. The non-lethal electrical shock causes pain to the bear momentarily, but fades away in minutes, and does not cause any damage to the bear. In contrast, unfortunately, it is common practice that, when a bear becomes publicly known as a problem bear that repeatedly breaks into buildings and/or vehicles, very commonly, the authorities will euthanize or otherwise kill the bear. So obviously, an electrical shock that last minutes is much better for the bear than euthanization.

The theory behind the invention is that bears will quickly learn to stay away from a house protected with the modular bear or other wild animal deterrent system for a house or building 5. Bears will remember the non-lethal electrical shock and they will not go near this area again for fear of getting another non-lethal electrical shock again. It typically takes only one initial electric shock to form a lasting impression with the bear. Bears will even become accustomed to food smells emanating from the house. However, bears will remember the non-lethal electrical shock and they will not come back to a house protected with the modular bear or other wild animal deterrent system for a house or building 5.

There are other effective bear deterrent systems that use a non-lethal electrical shock as a deterrent; however, all others or more heavy pieces of farm machinery that require a tedious labor-intensive time-taking procedure to remove wires and brackets when entering and exiting the house. This process could include: turning off the power supply, removing electric wires and brackets from around the door, removing electric wires and brackets from around the windows, removing electric wires and brackets from around the patio door, etc. It becomes simply too inconvenient and cumbersome to leave and return to the house each day. In contrast, Applicant's invention is a system that provides equivalent bear protection without the need to take the system down and reinstall it every time you want to leave or return to the house.

Applicant has occupied a cabin at Lake Tahoe, California, for decades and has been dealing with bears for decades. Applicant has taken the time to study bear deterrence over an extended period of time and has experimented with several bear deterrent apparatuses over the years. Applicant is also a vendor of deterrent systems to the Bear League at Lake Tahoe in Homewood, California. The modular bear or other wild animal deterrent system for a house or building 5 is the culmination of all of Applicant's experience with bears to yield the best and most convenient bear deterrent system available.

Modular bear or other wild animal deterrent system for a house or building 5 essentially comes in three base modes or three embodiments. The first embodiment uses two or more one-wire special strips 10. The second embodiment uses one or more two-wire special strips 20. The third embodiment uses two or more one-wire special strips 10 and one or more two-wire special strips 20. The major difference between a one-wire special strip 10 and a two-wire special strip 20 is that a two-wire special strip 20 can provide a shock all on its own without the need for other special strips. This is because one-wire is connected to the positive or terminal 62 and the other wire is connected to the negative or neutral terminal 64. In the case of a one-wire special strip 10, there is only one-wire. Thus, a bear must have electrical continuity with two one-wire strips 10 in order to receive an electrical shock. Thus, with a one-wire special strip 10, the bear 120 must contact a first one-wire special strip 10 and a second one-wire special strip 10 at the same time in order to receive a shock. In summary, a single two-wire special strip 20 can provide a shock while it takes two one-wire special strips 10 to provide a shock.

Applicant has discovered from many years of experience with bears, that bears use their front paws when they open a door on a house, open a window on a house, and open a door on a car. This invention presumes these facts about bears. Also, believe it or not, bears readily push and pull on door handles in order to open doors. If a bear wants to get through a door, the first thing it does is push and pull on the door handle of the door. Bears seem to know what a door handle is. Bears can even readily open a car door simply by pulling on the door handle of a car with their front paws and then enter the car without breaking any glass. There other factors that determine the best location to mount special strips 10,20, as described below. At any rate, in a way, each special strip 10,20 can be pinpointed and surgically positioned at the exact location that a bear 120 will readily contact with their front paws. If determining this exact location is difficult for some homeowners, they can simply install multiple special strips 10,20 on around each door and/or each window that is to be protected against. Since the modular bear or other wild animal deterrent system for a house or building 5 is modular, many special strips 10,20 can easily be installed and connected together or daisy chained together in order to quickly and easily install many special strips 10,20 around a door or window.

Figure 2:
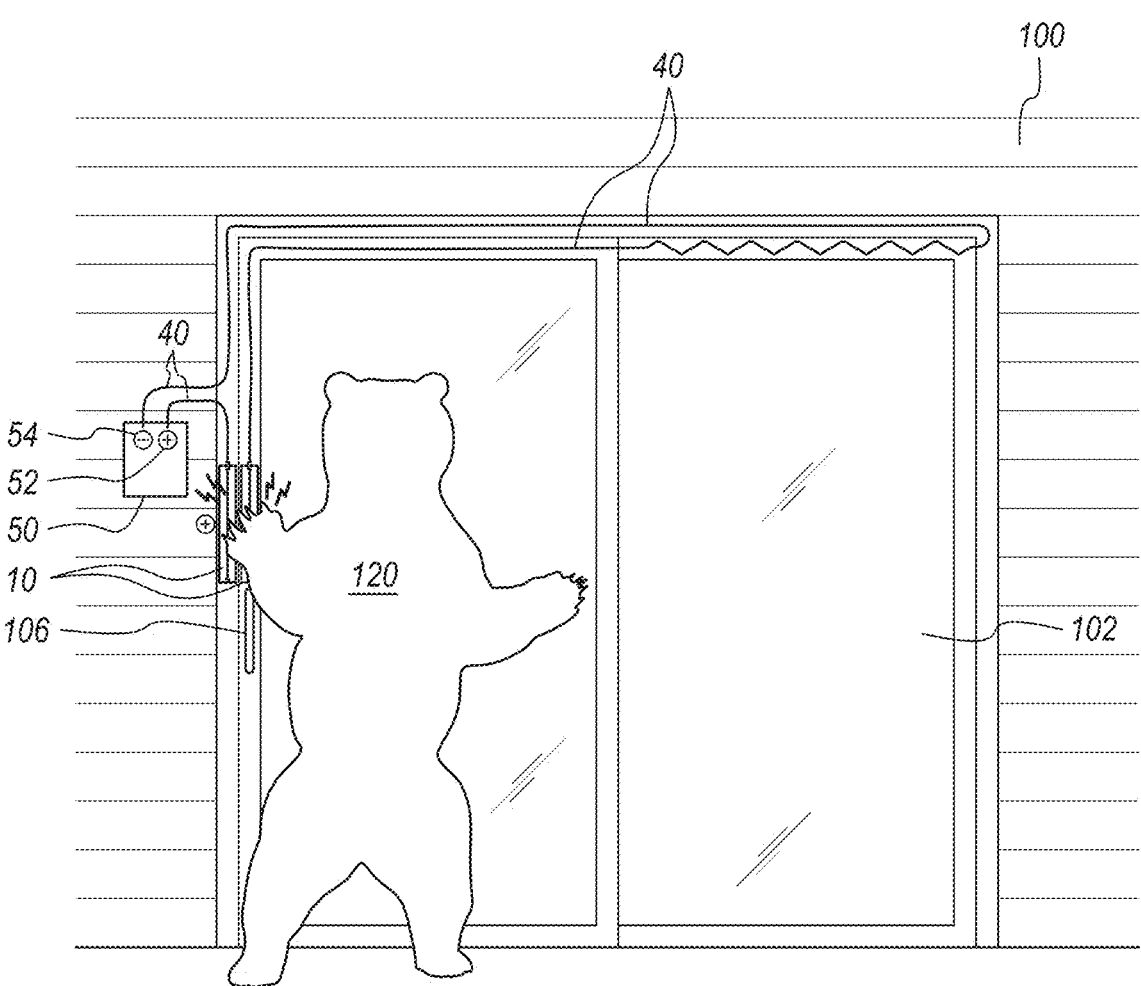
FIG. 2 is a view of FIG. 1 with a bear trying to open the sliding door and getting shocked or receiving an electrical shock from touching the two one-wire special strips.
Figure 3:
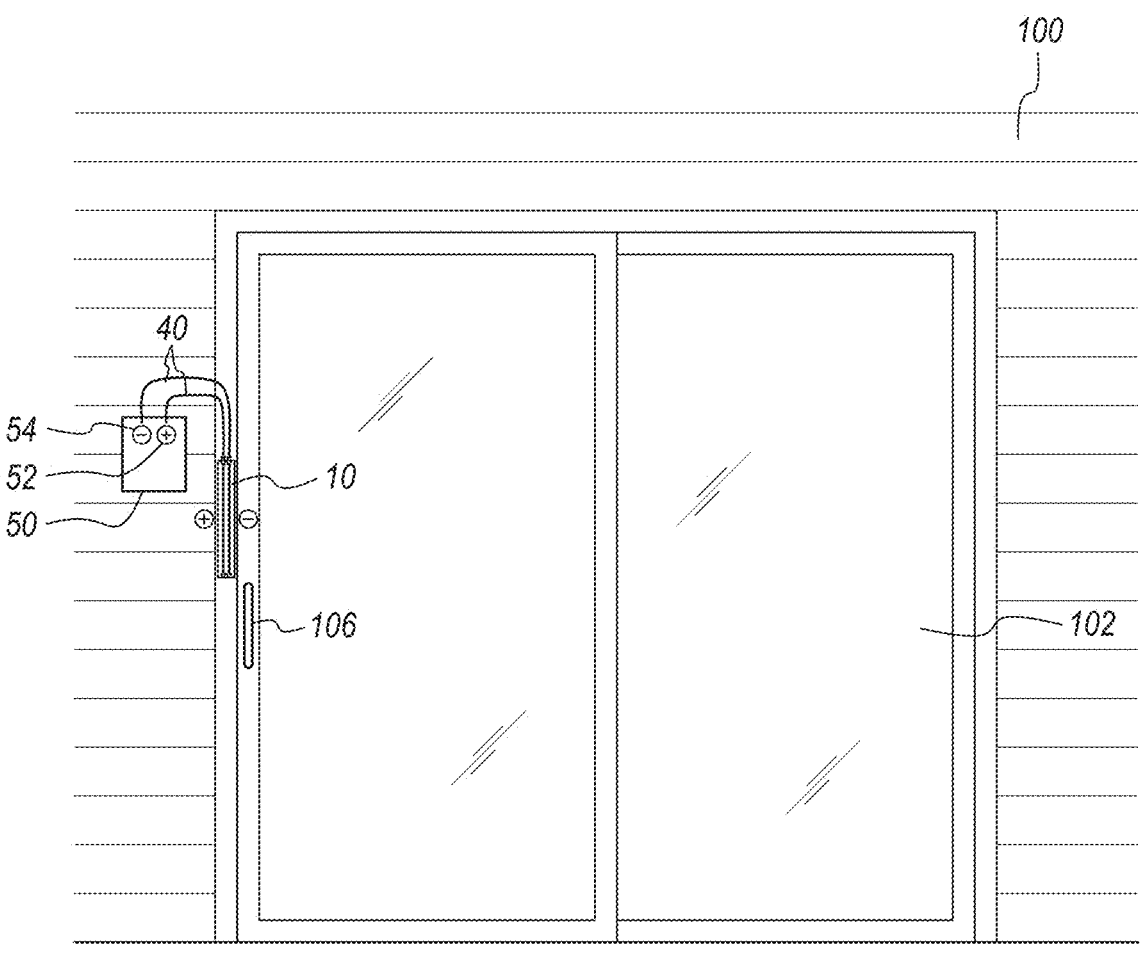
FIG. 3 is a view of a deterrent system with one two-wire special strip installed around the breech of a sliding door.

In the case of bear protecting a sliding door 102, one or more special strips 10,20 should be placed near the door handle 106 of the sliding door 102. One one-wire special strip 10 can be installed on the door trim, aligned with the door handle 106, and a second one-wire special strip 10 installed on the door frame, also aligned with the door handle 106. Thus, one one-wire special strip 10 is on one side of the door breech and another one-wire special strip 10 is on the other side of the door breech. The door breech is the opening of the door. This arrangement is depicted in FIGS. 1 and 2. Alternately, another option for a sliding door 102 is to use one two-wire special strip 20 installed on the door trim and aligned with the door handle 106, as depicted in FIG. 3.

Figure 4:
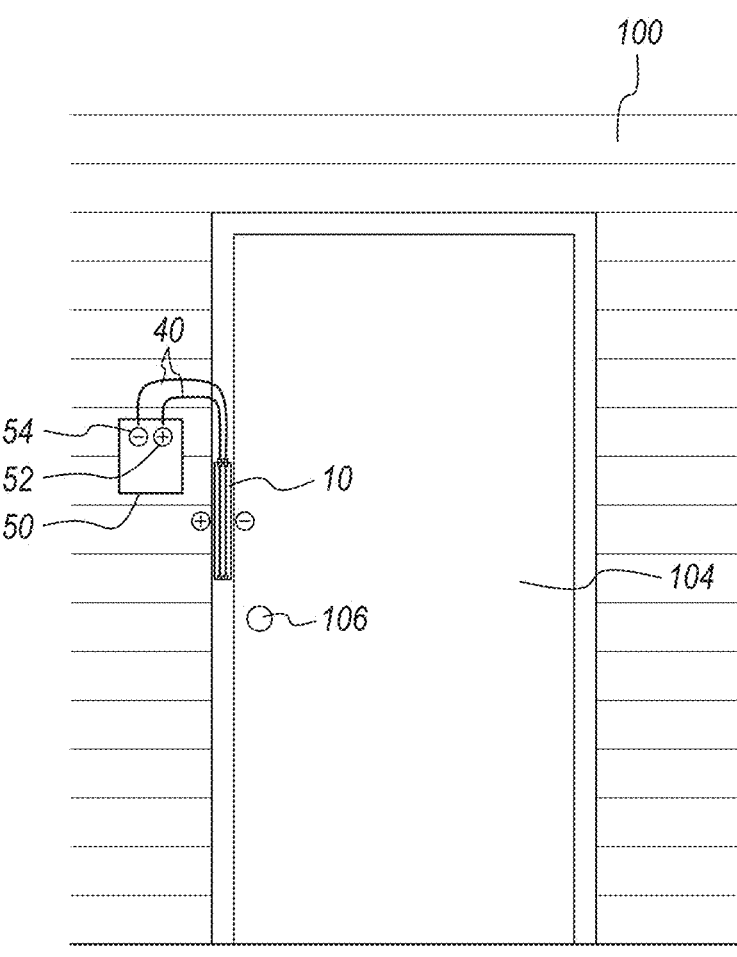
FIG. 4 is a view of a deterrent system with one two-wire special strip installed around the breech of a hinged door.

In the case of bear protecting a hinged door 104, one or more special strips 10,20 should be placed near the door handle 106 of the hinged door 104. One one-wire special strip 10 can be installed on the door trim, aligned with the door handle 106, and a second one-wire special strip 10 on the door frame, also aligned with the door handle 106. Thus, one one-wire special strip 10 is on one side of the door breech and another one-wire special strip 10 is on the other side of the door breech. Alternately, another option for a hinged door is to use one two-wire special strip 20 installed on the door trim and aligned with the door handle 106 as depicted in FIG. 4.

Figure 5:
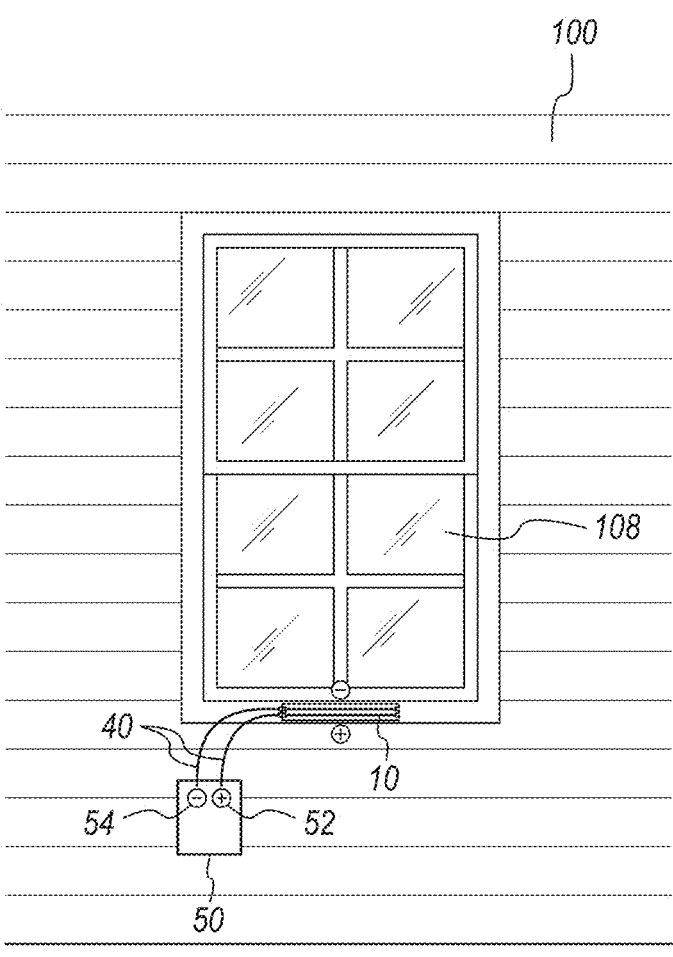
FIG. 5 is a view of a deterrent system with one two-wire special strip installed around the breech of a window.

In the case of bear protecting a window 108, one or more special strips 10,20 should be placed adjacent to the breech of the window 108, whether the window 108 is: a regular up-and-down opening window, a sliding window that opens side-to-side, or a casement window that opens with a shudder-like mechanism. Applicant has also discovered from many years of experience with bears, that bears know where a window opens or knows where the breech of the window is. This is probably because of their strong sense of smell. Thus, every bear 120 will know exactly where the window cracks open or breeches at. Thus, one or more special strips 10,20 should be installed adjacent to the breech of the window. For instance, one two-wire special strip 20 may be placed on the exterior window sill, adjacent to the breech of the window 108. Alternately, two or more one-wire special strips 10 may be used for each window breech with one one-wire special strip 10 on each side of the window breech. A regular up-and-down opening window is depicted in FIG. 5, wherein one two-wire special strip 20 is placed on the windowsill of the window frame directly adjacent to the breech of the window 108. This method of placement applies to all types of windows 108, where in one or more special strips 10,20 is placed adjacent to the breech of the window 108, whatever the type of window 108.

In one embodiment, modular bear or other wild animal deterrent system for a house or building 5 comprises: two or more one-wire special strips 10; at least a first jumper wire 40 or transfer wire 50; at least a second jumper wire 40 or transfer wire 50; and a power supply unit 60, wherein each member is connected together to form one electrical circuit with electrical continuity between each member.

In a second embodiment, modular bear or other wild animal deterrent system for a house or building 5 comprises: one or more two-wire special strips 20; at least a first jumper wire 40 or transfer wire 50; at least a second jumper wire 40 or transfer wire 50; and a power supply unit 60, wherein each member is connected together to form one electrical circuit with electrical continuity between each member.

In a third embodiment, modular bear or other wild animal deterrent system for a house or building 5 comprises: two or more one-wire special strips 10; one or more two-wire special strips 20; at least a first jumper wire 40 or transfer wire 50; at least a second jumper wire 40 or transfer wire 50; at least a third jumper wire 40 or transfer wire 50; at least a fourth jumper wire 40 or transfer wire 50; and a power supply unit 60, wherein each member is connected together to form one electrical circuit with electrical continuity between each member.

Each one or more one-wire special strips 10 comprises: a base layer 12 and a first exposed wire 14. Each one-wire special strip 10 is a self-contained unit or tile with one exposed electrical wire on the upper surface. Special electrical connectors are attached to each end of the exposed electrical wire. One or more one-wire special strips 10 can be installed on each door and/or each window that is to be protected against.

Base layer 12 is a rigid rectangular planer member or semi-rigid rectangular planer member. Base layer 12 has: a width, a length, a thickness, an upper surface, a lower surface, a first edge, a second edge, a third edge, a fourth edge, a plane, a latitudinal axis, and a longitudinal axis. Base layer 12 may have square corners or rounded corners. In the case of rounded corners, base layer 12 is oval shaped. The first edge runs along the width of base layer 12. The second and edge runs along the length of bases layer 12. The third edge runs along the width of base layer 12. The fourth edge runs along the length of base layer 12.

Base layer 12 is made of non-conductive material such as: wood, plastic, rubber, glass, ceramic, or other non-conductive material. Base layer 12 is nonconductive to prevent the electric charge on first exposed wire 14 and second exposed wire 24 from passing to the base layer or transferring to the base layer through conduction. In best mode, base layer 12 is a rigid strip of wood.

In some embodiment, base layer 12 may further comprise: an adhesive layer 30 and a release liner 32.

Adhesive layer 30 is a layer of a substance that is used for sticking objects or materials together or binds them together and resists their separation. Adhesive layer 30 has: a width, a length, a thickness, an upper surface, a lower surface, a first edge, a second edge, a third edge, a fourth edge, a latitudinal axis, and a longitudinal axis. The substance of adhesive layer 30 could be: glue, cement, mucilage, paste, epoxy, or any other sticky substance. Adhesive layer 30 is a layer of adhesive in the common definition of the words. In best mode, adhesive layer 30 is a layer of pressure sensitive adhesive. Adhesive layer 30 is deposited, attached, or installed on the lower surface of base layer 12 to completely cover the lower surface of base layer 12. Thus, the upper surface of adhesive layer 30 is attached to the lower surface of base layer 12. Adhesive layer 30 functions to attach each one or more one-wire special strips 10 to a door or window that has to be protected against. Adhesive layer 30 may be any known type of adhesive. In best mode, adhesive layer 30 is a pressure sensitive rubber resin adhesive or acrylic adhesive. As stated, modular bear or other wild animal deterrent system for a house or building 5 can be used and installed without the use of any tools. Adhesive layer 30 helps facilitate this aspect wherein each one or more one-wire special strips 10 maybe simply pressed onto a door or a window to attach thereto without the use of any tools or other extracurricular items or non-invention items like: nails, screws, tape, other adhesive, or other glue.

Release liner 32 is a strip of flexible material with nonstick or nonadherent properties on at least one surface. Liner 32 is a release liner in the common definition of the words. Release liner 32 has: a width, a length, a thickness, an upper surface, a lower surface, a first edge, a second edge, a third edge, a fourth edge, a latitudinal axis, and a longitudinal axis. The width and length of release liner 32 matches those of adhesive layer 30 and thus adhesive layer 30 and release liner 32 are the same size. The upper surface of release liner 32 has nonstick or non-adherent properties so that the upper surface may be pressed onto the lower surface of adhesive layer 30 and also removed from adhesive layer 30 without disturbing the adhesive layer or excessively sticking to the adhesive layer 30 in order to disturb adhesive layer 30 or remove any part of the adhesive layer 30. The upper surface of release liner 32 is attached to the lower surface of adhesive layer 30 to completely cover the entire lower surface of adhesive layer 30. Release liner 32 functions to cover and protect the adhesive layer 30 until when the user is ready to install the one-wire special strip 10 to a door or window. In order to install the one-wire special strip 10, the user simply removes the release liner 32 just before sticking it to the door or window. In this way, the release liner 32 protects the adhesive layer 30 from sticking to unwanted material and also keeps the adhesive layer 30 fresh and ready to stick onto a door or window. Release liner 32 could be any known type of release liner. In best mode, release liner 32 is a strip of waxed paper.

First exposed wire 14 is a length of rigid wire or semi-rigid wire. First exposed wire 14 has a first end, a second end, a length, an outer diameter, and a longitudinal axis. First exposed wire 14 is made of a conductive material such as: metal, graphite, conductive polymer, or other conductive material. Typical conductive metals are: silver, copper, gold, aluminum, zinc, or nickel. In best mode, first exposed wire 14 is made of copper. First exposed wire 14 may be a length of solid wire or a length of stranded/braided wire. In best mode, first exposed wire 14 is solid wire.

First exposed wire 14 is rigidly attached to the upper surface of base layer 12 wherein the first end of first exposed wire 14 is adjacent to the first edge of base layer 12 and the second end of first exposed wire 14 is adjacent to the third edge of base layer 12 and the longitudinal axis of first exposed wire 14 is parallel with the longitudinal axis of base layer 12. Rigid attachment may be accomplished by any known means such as: weld, solder, glue, epoxy, adhesive, rivets, clips, snaps, pins, or fasteners. Rigid attachment must be done in such a way so as to not block the conduction of electricity through first exposed wire, which is required for proper operation of the modular bear or other wild animal deterrent system for a house or building 5. Best mode, rigid attachment is accomplished by dabs of heavy duty non-conducting epoxy which rigidly attach first exposed wire 14 to base layer 12.

First exposed wire 14 further comprises: a first electrical connector 16 and a second electrical connector 18.

First electrical connector 16 is an electromechanical device used to create a mechanical and electrical connection between parts of an electrical circuit thereby joining them into a larger electrical circuit. First electrical connector 16 is an electrical connector in the common definition of the words. First electrical connector 16 may be any type of electrical connector. First electrical connector 16 is rigidly attached to the first end of first exposed wire 14. Rigid attachment may be accomplished by any known means such as: solder, crimping, welding, clamping, or other method. First electrical connector 16 could be a male connector or a female connector.

Second electrical connector 18 is an electromechanical device used to create a mechanical and electrical connection between parts of an electrical circuit thereby joining them into a larger electrical circuit. Second electrical connector 18 is an electrical connector in the common definition of the words. Second electrical connector 18 may be any type of electrical connector. Second electrical connector 18 is rigidly attached to the second end of first exposed wire 14. Rigid attachment may be accomplished by any known means such as: solder, crimping, welding, clamping, or other method. Second electrical connector 18 could be a male connector or a female connector.

First electrical connector 16 is reversibly electromechanically connectable to second electrical connector 18 by pressing the two connectors 16,18 together without the use of any tools required and vice versa.

A convention or specific order of arrangement is used with first and second electrical connectors 16,18. If the first electrical connector 16 is male, then second electrical connector 18 should be female, and vice versa. This way, a second one-wire special strip 10 can be very easily connected to the first one-wire special strip 10 because of the convention used, where the first side of all one-wire special strips 10 has a male connector, for instance, and the second side of all one-wire special strips 10 has a female connector. In this way, the first end of the second strip 10 can be easily connected to the second end of the first strip 10 in order to daisy chain or link the two strips together quickly and easily. As stated above, modular bear or other wild animal deterrent system for a house or building 5 is modular and can be installed without the use of any tools. This convention of electrical connectors helps accomplish these aspects wherein any number of one-wire special strips 10 can be connected together without the use of any tools. As discussed below, this convention also applies to jumper wires 40 and transfer wires 50, wherein any number of these wires 30,40 can also be connected and installed into modular bear or other wild animal deterrent system for a house or building 5 without the use of any tools. As detailed below, first exposed wire 14 may be connected to the positive or hot terminal 62 or negative or neutral terminal 64 of power supply unit 60.

In the case of a male connector for first electrical connector 16, first electrical connector 16 may simply be the end of the first exposed wire 14, wherein, actually there is no electrical connector. Wherein, just a bare wire acts as the male connector. The bare wire is received by and engages with the corresponding female connector, which clamps onto the bare end of wire to create a proper mechanical and electrical connection to the female connector. Thus, in some embodiments of this invention, first electrical connector 16 is deleted or omitted.

In the case of a male connector for second electrical connector 18, second electrical connector 18 may simply be the end of the first exposed wire 14, wherein, actually there is no electrical connector. Wherein, just a bare wire acts as the male connector. The bare wire is received by and engages with the corresponding female connector, which clamps onto the bare end of wire to create a proper mechanical and electrical connection to the female connector. Thus, in some embodiments of this invention, second electrical connector 18 is deleted or omitted.

Importantly, it should be noted that because of the convention or specific order of arrangement of first and second electrical connectors 16,18, one-wire special strips 10 may be easily and quickly electromechanically connected together without the use of any tools or other wiring. Because of the convention of electrical connectors specified above, you can simply plug the first side of a first one-wire special strip 10 into the second side of a second one-wire special strip 10, and vice versa, to quickly and easily electromechanically connected these members, without any wiring or any tools.

Each one or more two-wire special strips 20 comprise: a base layer 12; a first exposed wire 14; and a second exposed wire 24. Each two-wire special strip 20 is a self-contained unit or tile with two exposed electrical wires on the upper surface. Special electrical connectors are attached to each end of the two exposed electrical wires. One or more two-wire special strips 20 can be installed on each door and/or each window that is to be protected against.

The base layer 12 on each one or more two-wire special strips 20 is exactly like the base layer 12 on a one-wire special strip 10, as detailed above.

The base layer 12 on each one or more two-wire special strips 20 may further comprise: an adhesive layer 30 and a release liner 32, as detailed above.

The first exposed wire 14 on each one or more two-wire special strips 20 is exactly like the first exposed wire 14 on a one-wire special strip 10, as detailed above.

Second exposed wire 24 is a length of rigid wire or semi-rigid wire. Second exposed wire 24 has a first end, a second end, a length, an outer diameter, and a longitudinal axis. Second exposed wire 24 is made of a conductive material such as: metal, graphite, conductive polymer, or other conductive material. Typical conductive metals are: silver, copper, gold, aluminum, zinc, or nickel. In best mode, second exposed wire 24 is made of copper. Second exposed wire 24 may be a length of solid wire or a length of stranded/braided wire. In best mode, second exposed wire 24 is solid wire.

Second exposed wire 24 is rigidly attached to the upper surface of base layer 12 wherein the first end of exposed wire 14 is adjacent to the first edge of base layer 12 and the second end of exposed wire 14 is adjacent to the third edge of base layer 12 and the longitudinal axis of second exposed wire 24 is parallel with the longitudinal axis of base layer 12. Rigid attachment may be accomplished by any known means such as: weld, solder, glue, epoxy, adhesive, rivets, clips, snaps, pins, or fasteners. Rigid attachment must be done in such a way so as to not block the conduction of electricity through first exposed wire, which is required for proper operation of the modular bear or other wild animal deterrent system for a house or building 5. Best mode, rigid attachment is accomplished by dabs of heavy duty non-conducting epoxy which rigidly attach second exposed wire 24 to base layer 12.

Second exposed wire 24 further comprises: a first electrical connector 26 and a second electrical connector 28.

First electrical connector 26 is an electromechanical device used to create a mechanical and electrical connection between parts of an electrical circuit thereby joining them into a larger electrical circuit. First electrical connector 26 is an electrical connector in the common definition of the words. First electrical connector 26 may be any type of electrical connector. First electrical connector 26 is rigidly attached to the first end of second exposed wire 24. Rigid attachment may be accomplished by any known means such as: solder, crimping, welding, clamping, or other method. First electrical connector 26 could be a male connector or a female connector.

Second electrical connector 28 is an electromechanical device used to create a mechanical and electrical connection between parts of an electrical circuit thereby joining them into a larger electrical circuit. Second electrical connector 28 is an electrical connector in the common definition of the words. Second electrical connector 28 may be any type of electrical connector. Second electrical connector 28 is rigidly attached to the second end of second exposed wire 24. Rigid attachment may be accomplished by any known means such as: solder, crimping, welding, clamping, or other method. Second electrical connector 28 could be a male connector or a female connector.

First electrical connector 26 is reversibly electromechanically connectable to second electrical connector 28 by pressing the two connectors 26,28 together without the use of any tools required and vice versa. In any particular deterrent system 5, as stated below, a convention or specific order of arrangement of electrical connectors is used, wherein first connector 26 on each second exposed wire 24 is the same as first connector 16 on first exposed wire 14 and second connector 28 on each second exposed wire 24 is the same as second connector 18 on first exposed wire 14. This convention or specific order of arrangement of electrical connectors is used to allow connectability of elements of the system 5 without requiring any tools.

A convention or specific order of arrangement is used with first and second electrical connectors 26,28. If the first electrical connector 26 is male, then second electrical connector 28 should be female, and vice versa. This way, a second two-wire special strip 20 can be very easily connected to the first two-wire special strip 20 because of the convention used, where the first side of all two-wire special strips 20 has a male connector, for instance, and the second side of all two-wire special strips 20 has a female connector. In this way, the first end of the second strip 10 can be easily connected to the second end of the first strip 10 in order to daisy chain or link the two strips together quickly and easily. As stated above, modular bear or other wild animal deterrent system for a house or building 5 is modular and can be installed without the use of any tools. This convention of electrical connectors helps accomplish these aspects wherein any number of two-wire special strips 20 can be connected together without the use of any tools. As discussed below, this convention also applies to jumper wires 40 and transfer wires 50, wherein any number of these wires 30,40 can also be connected and installed into modular bear or other wild animal deterrent system for a house or building 5 without the use of any tools. As detailed below, second exposed wire 24 may be connected to the positive or hot terminal 62 or negative or neutral terminal 64 of power supply unit 60.

In the case of a male connector for first electrical connector 26, first electrical connector 26 may simply be the end of the second exposed wire 24, wherein, actually there is no electrical connector. Wherein, just a bare wire acts as the male connector. The bare wire is received by and engages with the corresponding female connector, which clamps onto the bare end of wire to create a proper mechanical and electrical connection to the female connector. Thus, in some embodiments of the invention, first electrical connector 26 is deleted or omitted.

In the case of a male connector for second electrical connector 28, second electrical connector 28 may simply be the end of the second exposed wire 24, wherein, actually there is no electrical connector. Wherein, just a bare wire acts as the male connector. The bare wire is received by and engages with the corresponding female connector, which clamps onto the bare end of wire to create a proper mechanical and electrical connection to the female connector. Thus, in some embodiments of the invention, second electrical connector 28 is deleted or omitted.

Importantly, it should be noted that because of the convention or specific order of arrangement of first and second electrical connectors 26,28, two-wire special strips 20 may be easily and quickly electromechanically connected together without the use of any tools or other wiring. Because of the convention of electrical connectors specified above, you can simply plug the first side of a first two-wire special strip 20 into the second side of a second two-wire special strip 20, and vice versa, to quickly and easily electromechanically connected these members, without any wiring or any tools.

Importantly, it should be noted that because of the convention or specific order of arrangement electrical connectors 16, 18,26,28, two-wire special strips 20 may be easily and quickly electromechanically connected to one-wire special strips 10 without the use of any tools or other wiring. Because of the convention of electrical connectors specified above, you can simply plug the first side of a first two-wire special strip 20 into the second side of a second side of a one-wire special strip 10, and vice versa, to quickly and easily electromechanically connected these members, without any wiring or any tools. Also, you can simply plug the first side of a first one-wire special strip 10 into the second side of a second side of a two-wire special strip 20, and vice versa, to quickly and easily electromechanically connected these members, without any wiring or any tools.

As stated, any variety or number of one-wire special strips 10 and/or two-wire special strips, 20 may be used to create a deterrent system because of the modular aspect of this invention. These options partly depend on the following.

In order for a bear or other wild animal 120 to feel or experience an electrical shock, the bear's paw or other body part must make an electrical connection between a positive or hot exposed wire 14,24 and a negative or neutral exposed wire 14,24. Each of first exposed wire 14 and/or second exposed wire 24 can be a positive or hot wire or a negative or neutral wire, depending on how the power supply unit 60 is wired in the deterrent system, as discussed below. Each special strip 10 is modular and universal, so every first exposed wire 14 and/or second exposed wire 24 can be wired as a positive or hot wire or a negative or neutral wire. The bear's paw must touch a positive or hot exposed wire and a negative or neutral exposed wire at the same time in order to close an electrical circuit between these two-wires and generate a shock to the bear 120. The bear's paw actually facilitates the electrical current which runs through the bear's paw.

In the case of one-wire special strips 10, there must be a second one-wire special strip 10 in close vicinity to the first one-wire special strip 10, in order to shock the bear 120. The second one-wire special strip 10 must be placed in close vicinity to the first one-wire special strip 10 so that the bear's paw can touch two exposed wires 14 at the same time in order to facilitate a shock. If the bear's paw cannot touch two one-wire strips 10 and two exposed wires 14 at the same time, then there will be no shock for the bear 120.

The best way to ensure that a shock will occur is to place one one-wire special strip 10 on both sides of a door breech or a window breech, as depicted in FIG. 1. FIG. 1 depicts two one-wire special strips 10 with one exposed wire 14 on each special strip 10. In FIG. 1, one one-wire special strip 10 is connected to the positive or hot terminal 62 on the power supply unit 60 and the second one-wire special strip 10 is connected to the negative or neutral terminal 64 on the power supply unit 60.

Also, in order for the shock to occur, the distance between the exposed wire 14 on each one-wire special strip 10 must be less than the dimensions of a bear's paw. Note that the size of a bear's paw can be anywhere from about 4 inches by 4 inches to about 24 inches by 24 inches. Therefore, in best mode, the width of a one-wire special strip 10 and the width of a two-wire special strip 20 should be about 1-4 inches and the distance between the exposed wires 14 on a pair of one-wire special strips 10 should be about 4-6 inches.

In the case of two-wire special strips 20, one two-wire special strip 20 is all that is required for the bear 120 to feel or experience an electrical shock. In these embodiments, when the bear 120 touches one two-wire special strip 20 with two exposed wires 14,24, the bear's paw contacts a positive or hot exposed wire 14,24 and a negative or neutral exposed wire 14,24 at the same time because the width of each two-wire special strip 20 is less than the dimensions of a bear's paw and the distance between the two exposed wires 14, 24 is also less than the dimensions of a bear paw.

In the case of two-wire special strips 20, the first exposed wire 14 could be a positive or hot terminal wire or a negative or neutral terminal wire and likewise second exposed wire 24 could be a positive or hot terminal wire or a negative or neutral terminal wire, depending on how the two-wire special strip 20 is connected to the power supply unit 60, as discussed below. FIG. 3 depicts a two-wire special strip 20 with two exposed wires 14,24 on the special strip 20. In FIG. 3, first exposed wire 14 is connected to the positive or hot terminal 62 on the power supply unit 60 and the second exposed wire 24 is connected to the negative or neutral terminal 64 on the power supply unit 60.

Modular bear or other wild animal deterrent system for a house or building 5 further comprises: a power supply unit 60.

Power supply unit 60 is an electrical device that supplies electric power to an electrical load. The main purpose of a power supply is to convert electric current from a source to the correct voltage, current, and frequency to properly power the load. As a result, power supplies are sometimes referred to as electric power converters. The load in the case of this invention is the shocking of the bear. Power supply unit 60 is a power supply in the common definition of the words. Power supply unit 60 produces a pulsed electric charge and transfers this charge to: all special strips 10, all exposed wires 14,24, all jumper wires 40, and all transfer wires 50 of a particular installed deterrent system. Typically, a standard electric bear fence power supply has an output of at least 1-5 joules and maintains a voltage of 5,000 to 7,000 volts that delivers a significant shock to the bear. This is considered a high-output or large power supply. Such a large power supply is used to deliver a high-voltage, short-duration pulse that is required to penetrate a bear's thick fur. Thus, a typical electric bear fence will shock a bear, even when the bear 120 only brushes up against the fence with their side. In contrast, the power supply unit 60 of this invention is considerably smaller. This is because Applicant is relying on merely the bear's paw touching the exposed wires 14,24 to receive the electrical shock and also because bear's paws do not have fur on the bottom. The power supply unit 60 of this invention only needs to produce 100-250 volts with a pulsed output that delivers 0.5-0.9 joule per pulse. In best mode, the power supply unit 60 of this invention produces 115 V at 60 cycles with pulsed output at one second intervals that delivers 0.5 joules per pulse.

Power supply unit 60 has an input connection and an output connection. The input connection must be connected to a power source (not depicted), which could be an alternating current power source or a direct current power source such as a battery. The output connection is connected to: all special strips 10,20, all jumper wires 40, and all transfer wires 50 of a particular installed deterrent system. The output connection of power supply unit 60 comprises two terminals: a negative output terminal and a positive output terminal, as depicted. As stated, all components of bear or other wild animal modular deterrent system for a house or building 5 are electromechanically connected together to form one electrical circuit. Thus, all special strips 10,20, all jumper wires 40, all transfer wires 50, and the power supply unit 60 are electromechanically connected together to form one electrical circuit. This is accomplished by electromechanically connecting approximately half of the special strips 10,20, half of the jumper wires 40, and/or half of the transfer wires 50 to the negative output terminal of the power supply unit 60 and electromechanically connecting the other half of the special strips 10, jumper wires 40, and/or transfer wires 50 to the positive output terminal of the power supply unit 60. These members may be connected in parallel and/or series to create a deterrent system with any number of special strips 10,20 that protects any number of doors and windows. Importantly, the electrical circuit is not closed but rather is left open. It is up to the bear or other wild animal 120 to close the circuit. When a bear 120 touches two exposed wires 14,24, the circuit is closed, and the pulsed electrical signal is passed between the two exposed wires 14,24, flowing through the bear's paw. At which point in time, the bear 120 will very quickly remove its paw from contact with the two exposed wires 14,24.

Each special strip 10,20 is connected to the power supply unit 60 using two or more: jumper wires 40 or transfer wires 50. As stated above, each special strip 10,20 may be easily electromechanically connected to all other special strips 10,20. Wires would not necessarily be needed to connect special strips 10,20, however, wires certainly may be used to connect special strips 10,20. In any evet, there typically must be at least two-wires 40,50 in every deterrent system: one-wire 40,50 connecting special strips 10,20 to the positive or hot terminal 62 of power supply unit 60 and a second wire 40,50 connecting special strips 10,20 to the negative or neutral terminal 64 of power supply unit 60.

Each jumper wire 40 is assembly of one or more electrically conductive cables or strands surrounded by an insulating cover member, wherein the one or more electrically conductive cables or strands is used as an electrical conductor to carry electric current. Jumper wire 40 is a flexible member. Jumper wire 40 is an electrical wire in the common definition of the words. Jumper wire 40 has: a first end, a second end, a length, and an outer diameter. Any known type of electrical wire or cable may be used for jumper wire 40. Each jumper wire 40 has the same make up as each transfer wire 50. The difference is that jumper wires 40 are short or shorter than transfer wires 50. Jumper wires 40 are for connecting two components of the deterrent system that are in close proximity. Jumper wires 40 may come in varying lengths such as: one foot, two feet, four feet, six feet, and so on. The varied length of jumper wires 40 supports the aspect of installing the deterrent system without the use of any tools. If jumper wires 40 come in various lengths, then no electrical tools are needed for cutting wires, splicing wires, adding connectors, and so forth.

Jumper wire 40 further comprises: a first electrical connector 42 and a second electrical connector 44.

First electrical connector 42 is an electromechanical device used to create a mechanical and electrical connection between parts of an electrical circuit thereby joining them into a larger electrical circuit. First electrical connector 42 is an electrical connector in the common definition of the words. First electrical connector 42 may be any type of electrical connector.

First electrical connector 42 is rigidly attached to the first end of each jumper wire 40. Rigid attachment may be accomplished by any known means such as: solder, crimping, welding, clamping, or other method.

First electrical connector 42 could be a male connector or a female connector.

Second electrical connector 44 is an electromechanical device used to create a mechanical and electrical connection between parts of an electrical circuit thereby joining them into a larger electrical circuit. Second electrical connector 44 is an electrical connector in the common definition of the words. Second electrical connector 44 may be any type of electrical connector. Second electrical connector 44 is rigidly attached to the second end of each jumper wire 40. Rigid attachment may be accomplished by any known means such as: solder, crimping, welding, clamping, or other method.

Second electrical connector 44 could be a male connector or a female connector.

First electrical connector 42 is reversibly electromechanically connectable to second electrical connector 44 by pressing the two connectors 42,44 together without the use of any tools required and vice versa. In any particular deterrent system 5, as stated below, a convention or specific order of arrangement of electrical connectors is used, wherein first connector 42 on each jumper wire 40 is the same as first connector 16 on first exposed wire 14 and second connector 44 on each jumper wire 40 is the same as second connector 18 on first exposed wire 14. This convention or specific order of arrangement of electrical connectors is used to allow connectability of elements of the system 5 without requiring any tools.

A convention or specific order of arrangement is used with first and second electrical connectors 42,44. If the first electrical connector 42 is male, then second electrical connector 44 should be female, and vice versa. The same convention must be used on: each one-wire special strip 10, each two-wire special strip 20, each jumper wire 40, and each transfer wire 50, of a particular system, in order for the modularity of the invention to function properly.

In the case of a male connector for first electrical connector 42, first electrical connector 42 may simply be the stripped end of the jumper wire 40, wherein, actually there is no electrical connector. Wherein, just a bare wire acts as the male connector. The bare wire is received by and engages with the corresponding female connector, which clamps onto the bare end of wire to create a proper mechanical and electrical connection to the female connector. Thus, in some embodiments of the invention, first electrical connector 42 is deleted or omitted.

In the case of a male connector for second electrical connector 44, second electrical connector 44 may simply be the stripped end of the jumper wire 40, wherein, actually there is no electrical connector. Wherein, just a bare wire acts as the male connector. The bare wire is received by and engages with the corresponding female connector, which clamps onto the bare end of wire to create a proper mechanical and electrical connection to the female connector. Thus, in some embodiments of the invention, second electrical connector 44 is deleted or omitted.

Each transfer wire 50 is assembly of one or more electrically conductive cables or strands surrounded by an insulating cover, wherein the one or more electrically conductive cables or strands is used as an electrical conductor to carry electric current. Transfer wire 50 is a flexible member. Transfer wire 50 is an electrical wire in the common definition of the words. Transfer wire 50 has: a first end, a second end, a length, and an outer diameter. Any known type of electrical wire or cable may be used for transfer wire 50. Each jumper wire 40 has the same make up as each transfer wire 50. The difference is that transfer wires 50 are long or longer than transfer wires 50. Transfer wires 50 are for connecting two components of the deterrent system that are relatively far from each other. Transfer wires 40 may come in varying lengths such as: 10 feet, 20 feet, 40 feet, 60 feet, and so on. The varied length of transfer wires 50 supports the aspect of installing the deterrent system without the use of any tools. If transfer wires 50 come in various lengths, then no electrical tools are needed for cutting wires, splicing wires, adding connectors, and so forth.

Transfer wire 50 further comprises: a first electrical connector 52 and a second electrical connector 54.

First electrical connector 52 is an electromechanical device used to create a mechanical and electrical connection between parts of an electrical circuit thereby joining them into a larger electrical circuit. First electrical connector 52 is an electrical connector in the common definition of the words. First electrical connector 52 may be any type of electrical connector.

First electrical connector 52 is rigidly attached to the first end of each transfer wire 50. Rigid attachment may be accomplished by any known means such as: solder, crimping, welding, clamping, or other method.

First electrical connector 52 could be a male connector or a female connector.

Second electrical connector 54 is an electromechanical device used to create a mechanical and electrical connection between parts of an electrical circuit thereby joining them into a larger electrical circuit. Second electrical connector 54 is an electrical connector in the common definition of the words. Second electrical connector 54 may be any type of electrical connector. Second electrical connector 54 is rigidly attached to the second end of each transfer wire 50. Rigid attachment may be accomplished by any known means such as: solder, crimping, welding, clamping, or other method.

Second electrical connector 54 could be a male connector or a female connector.

First electrical connector 52 is reversibly electromechanically connectable to second electrical connector 54 by pressing the two connectors 52,54 together without the use of any tools required and vice versa. In any particular deterrent system 5, as stated below, a convention or specific order of arrangement of electrical connectors is used, wherein first connector 52 on each transfer wire 50 is the same as first connector 16 on first exposed wire 14 and second connector 54 on each transfer wire 50 is the same as second connector 18 on first exposed wire 14. This convention or specific order of arrangement of electrical connectors is used to allow connectability of elements of the system 5 without requiring any tools.

Transfer wires 50 may have one or more corrugated segments 56 as depicted in FIG. 1. Corrugated segments 56 are accordion-like segments or segments with a plurality of bends formed into the wire that allow the corrugated segment 56 of the wire to expand and contract or shorten and lengthen without breaking the wire or damaging the wire. The purpose of the corrugated segments 56 is to allow a sliding door 102 to open or close and/or a window 108 to open or close while keeping electrical continuity between the two ends of the corrugated segment 56 of the wire.

A convention or specific order of arrangement is used with first and second electrical connectors 52,54. If the first electrical connector 52 is male, then second electrical connector 54 should be female, and vice versa. The same convention must be used on: each one-wire special strip 10, each two-wire special strip 20, each jumper wire 40, and each transfer wire 50, of a particular system, in order for the modularity of the invention to function properly.

In the case of a male connector for first electrical connector 52, first electrical connector 52 may simply be the stripped end of the transfer wire 50, wherein, actually there is no electrical connector. Wherein, just a bare wire acts as the male connector. The bare wire is received by and engages with the corresponding female connector, which clamps onto the bare end of wire to create a proper mechanical and electrical connection to the female connector. Thus, in some embodiments of the invention, first electrical connector 52 is deleted or omitted.

In the case of a male connector for second electrical connector 54, second electrical connector 54 may simply be the stripped end of the transfer wire 50, wherein, actually there is no electrical connector. Wherein, just a bare wire acts as the male connector. The bare wire is received by and engages with the corresponding female connector, which clamps onto the bare end of wire to create a proper mechanical and electrical connection to the female connector. Thus, in some embodiments of the invention, second electrical connector 52 is deleted or omitted.

In all embodiments, at least two: jumper wires 40 and/or transfer wires 50 are required. This means a system may have: two jumper wires 40; two transfer wires 50; or one jumper wire 40 and one transfer wire 50.

As stated above, the first exposed wire 14 on each one-wire special strip 10 is connected to: either positive or hot terminal 62 on power supply unit 60 or the negative or neutral terminal 64 on power supply unit 60. Essentially, this means that the first exposed 14 wire on essentially half of the one-wire special strips 10 in a system is connected to the positive or hot terminal 62 and essentially the other half of the one-wire special strips 10 in a system is connected to the negative or neutral terminal 64.

As stated above, the first exposed wire 14 on every two-wire special strip 20 is connected to: either positive or hot terminal 62 on power supply unit 60 or the negative or neutral terminal 64 on power supply unit 60.

As stated above, the second exposed wire 24 on every two-wire special strip 20 is connected to: either positive or hot terminal 62 on power supply unit 60 or the negative or neutral terminal 64 on power supply unit 60.

A convention or specific order of arrangement is used with wiring special strips 10,20 to the power supply unit 60. This means that if the first exposed wire 14 on every two-wire special strip 20 is connected to the positive or hot terminal 62, then the second exposed wire 24 on every two-wire special strip 20 must be connected to the negative or neutral terminal 64, and vice versa. If this convention or specific order of arrangement is not used and, for instance, the first exposed wire 14 on one two-wire special strip 20 is connected to the positive or hot terminal 62 and the first exposed wire 14 on another two-wire special strip 20 is also connected to the positive or hot terminal 62, then an electrical short circuit would take place which could damage the power supply unit 60 and in any event would render the deterrent system useless.

Modular bear or other wild animal deterrent system for a house or building 5 is installed on a house or building as follows.

In the case of the first embodiment, two or more one-wire special strips 10 are installed on each door and window that is to be protected against, installing half the one-wire special strip 10 on one side of the breech of the door or window and the other half of the one-wire special strips 10 on the other side of the breech of the door or window. Each one-wire special strip 10 maybe simply placed on the door or window or maybe stuck to the door or window using the adhesive layer 30 mentioned above. To accomplish this, the installation area on the door or window is first cleaned and dried. Then the release liner 32 is removed from the particular one-wire special strip 10 that is to be installed. Then the adhesive layer 40 is firmly pressed onto the installation area and held therefore a minute or so to allow the adhesive layer 30 to stick and adhere to the installation area. This process is repeated for every particular one-wire special strip 10 that is to be installed. Optionally, each one-wire special strip 10 may be simply taped to the door or window. Still optionally, each one-wire special strip 10 may be tacked to the door or window using a dab of silicone adhesive or adhesive caulking or a small nail or small screw. Then, each two-wire special strip 10 is electromechanically connected to the power supply unit 60 using one or more jumper wires 40 and/or one or more transfer wires 50.

In the case of the second embodiment, one or more two-wire special strips 20 is installed on each door and window that is to be protected against, installing each adjacent to the breech of the door or window. Each two-wire special strip 20 maybe simply placed on the door or window or maybe stuck to the door or window using the adhesive layer 30 mentioned above. To accomplish this, the installation area on the door or window is first cleaned and dried. Then the release liner 32 is removed from the particular two-wire special strip 20 that is to be installed. Then the adhesive layer 40 is firmly pressed onto the installation area and held therefore a minute or so to allow the adhesive layer 30 to stick and adhere to the installation area. This process is repeated for every particular two-wire special strip 20 that is to be installed. Optionally, each two-wire special strip 20 may be simply taped to the door or window. Still optionally, each two-wire special strip 20 may be tacked to the door or window using a dab of silicone adhesive or adhesive caulking or a small nail or small screw. Then, each two-wire special strip 20 is electromechanically connected to the power supply unit 60 using one or more jumper wires 40 and/or one or more transfer wires 50.

In the case of the third embodiment, two or more one-wire special strips 10 are installed on doors or windows that are to be protected against, installing half of the one-wire special strips 10 on one side of the breech of the door or window and the other half of the one-wire special strips 10 on the other side of the breech of the door or window.

Each special strip 10,20 maybe simply placed on the door or window or maybe stuck to the door or window using the adhesive layer 30 mentioned above. To accomplish this, the installation area on the door or window is first cleaned and dried. Then the release liner 32 is removed from the particular special strip 10,20 that is to be installed. Then the adhesive layer 40 is firmly pressed onto the installation area and held therefore a minute or so to allow the adhesive layer 30 to stick and adhere to the installation area. This process is repeated for every particular special strip 10,20 that is to be installed. Optionally, each special strip 10,20 may be simply taped to the door or window. Still optionally, each special strip 10,20 may be tacked to the door or window using a dab of silicone adhesive or adhesive caulking or a small nail or small screw. Then, each special strip 10,20 is electromechanically connected to the power supply unit 60 using one or more jumper wires 40 and/or one or more transfer wires 50.

Figure 6:
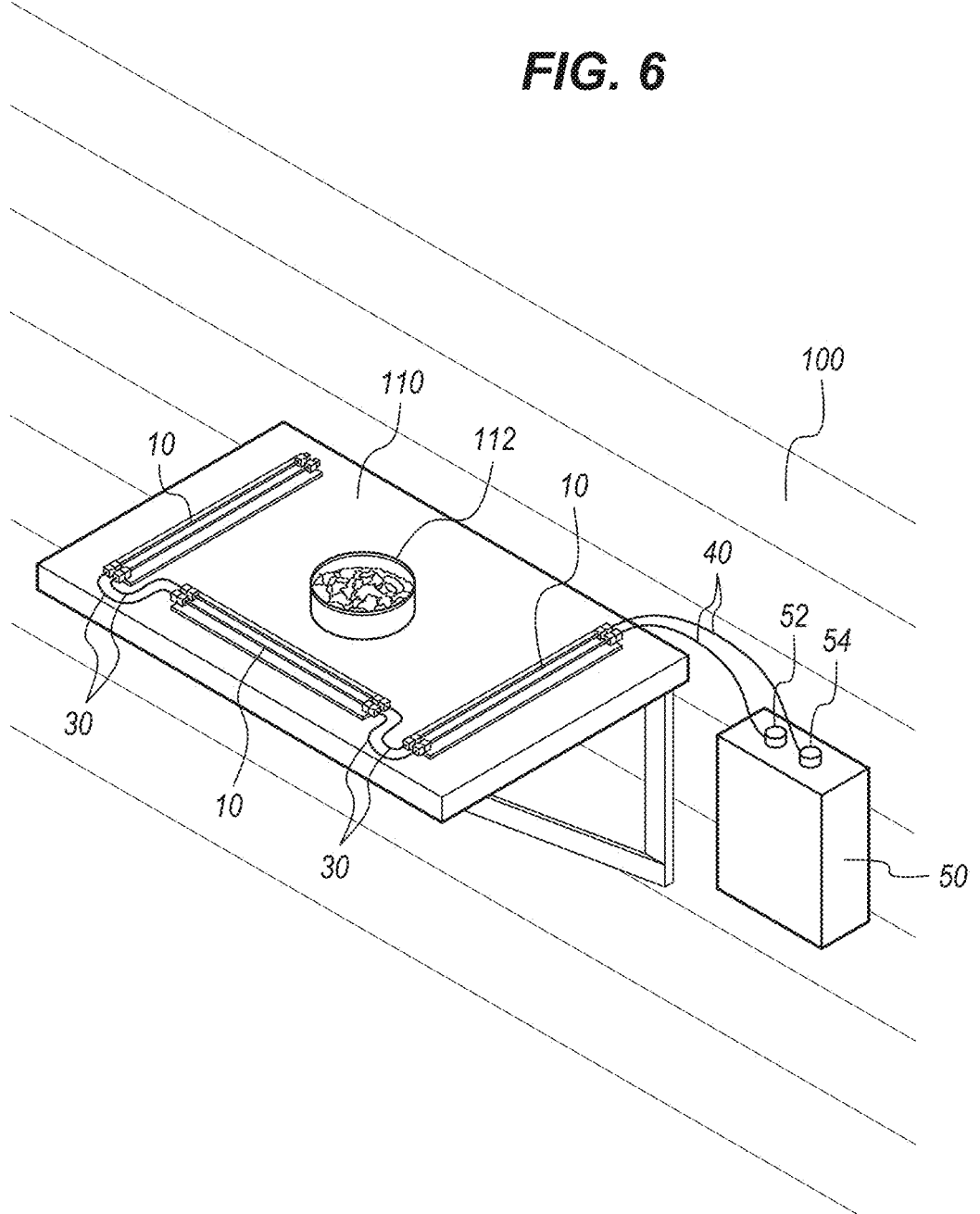
FIG. 6 is a view of a deterrent system with three two-wire special strips installed around bait sitting on a shelf on the outside wall of a house or building.
Figure 7:
FIG. 7 is a view of a deterrent system with one two-wire special strip installed on top of bait sitting on a shelf on the outside wall of a house or building.
Figures 8, 9:
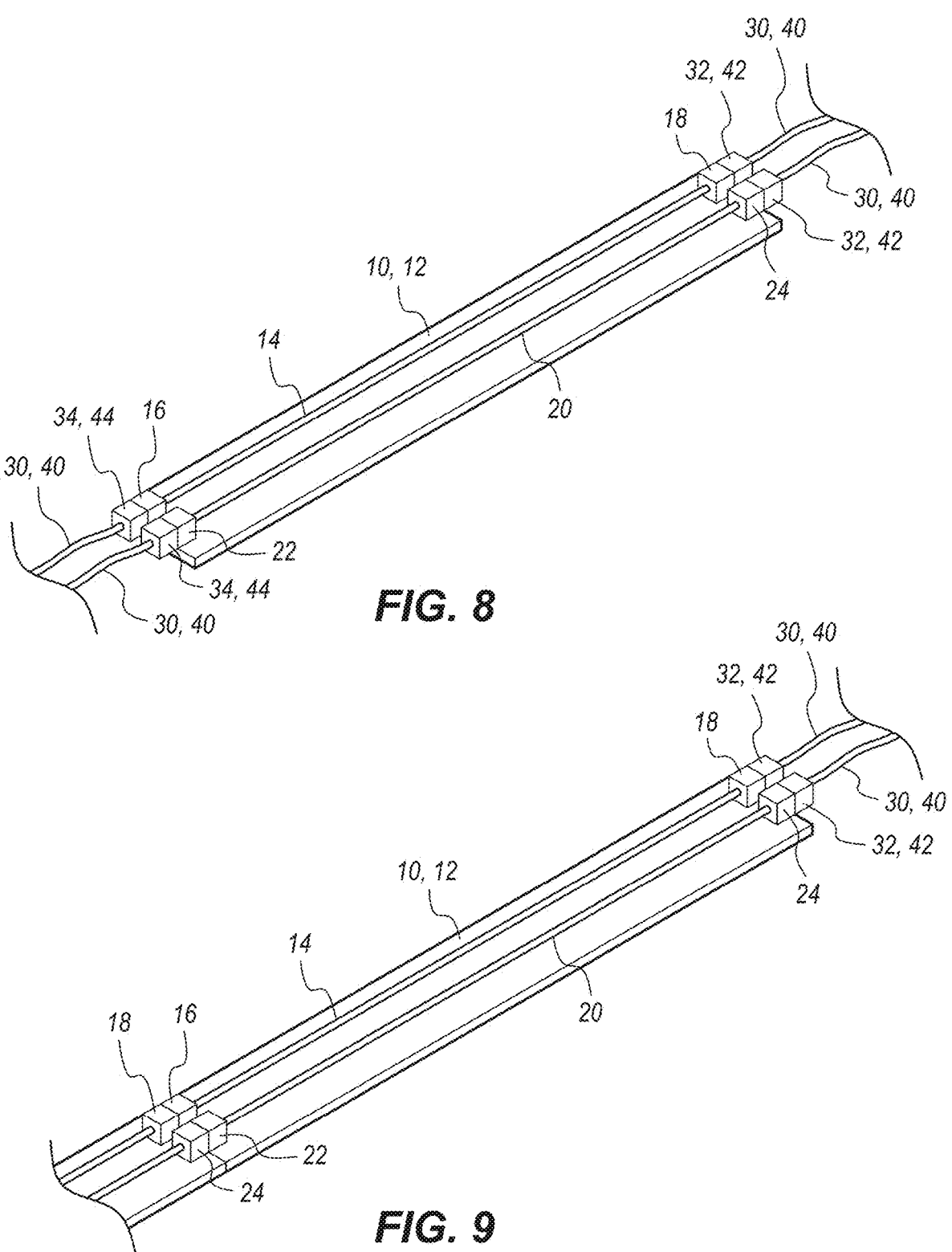
FIG. 8 is a view of a two-wire special strip with its first end connected to two jumper wires or two transfer wires and its second end connected to two jumper wires or two transfer wires.
FIG. 9 is a view of a two-wire special strip with its first end connected to a second two-wire special strip 20 and its second end connected to a third two-wire special strip.
Figure 10:
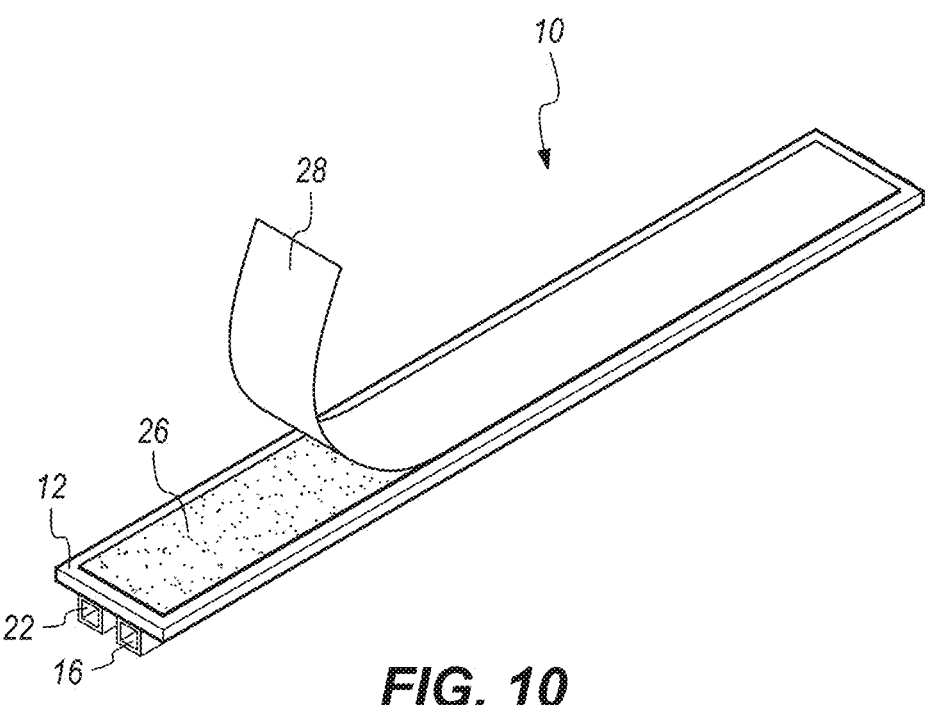
FIG. 10 is a lower perspective view of an embodiment of a two-wire special strip with an adhesive layer and a release liner.
Figure 11:
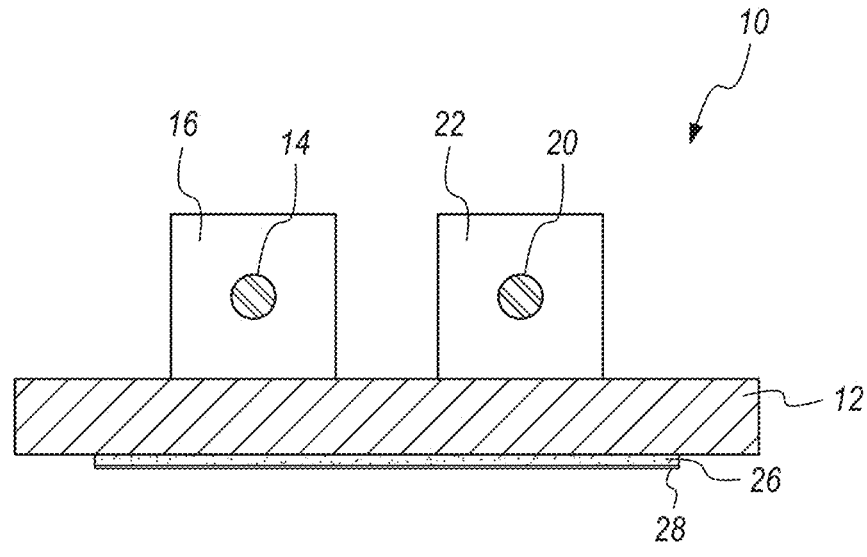
FIG. 11 is a cross-sectional view of an embodiment of a two-wire special strip with an adhesive layer and a release liner.

FIGS. 6 and 7 depict an alternate method to use modular bear or other wild animal deterrent system for a house or building 5 wherein bait 112 is used. Bait 112 is placed on the exterior of the house or building and in close proximity to one or more special strip 10, 20. A bear 120 is attracted to the bait 112. The bear 120 then tries to eat the bait 112 using its mouth or paw. At which point in time, the bear 120 is shocked, which causes the bear 120 to feel pain and run away. The bear 120 will remember the pain of the electric shock and will not come near this particular area again. In the bear's mind, this bait 112 will be associated with the whole house or building in general to the bear 120. As a result, the bear 120 will not return to this area of the house or building. The bear 120 will remember this it's whole life. And, by chance, if the bear tries to test it a second time, it will be shocked a second time, and then, for sure, the bear 120 will remember this for the rest of its life. The process of using bait 112 to attract a bear 120 that you are ultimately trying to deter may sound counter intuitive. Also, it may seem cruel to attract a bear 120 with bait only to shock it and chase it away. However, taking into account that the alternative treatment for a problem bear that repeatedly breaks into a house or a building is to have the bear euthanized, it is actually a very humane way to handle bears, looking at it from the perspective that you are actually saving the bear's life.

What is claimed:

1. A modular bear or other wild animal deterrent system for a house or building comprising: a first one-wire special strip; a second one-wire special strip; a first jumper wire or transfer wire; a second jumper wire or transfer wire; and a power supply unit, wherein, said first one-wire special strip and said second one-wire special strip each comprise: a base layer and a first exposed wire, wherein, said base layer is a rigid or semi-rigid planer member, said base layer has: a width, a length, a thickness, an upper surface, a lower surface, a first edge, a second edge, a third edge, a fourth edge, a plane, a latitudinal axis, and a longitudinal axis, said first exposed wire is a length of rigid wire or semi-rigid wire, said first exposed wire has a first end, a second end, a length, an outer diameter, and a longitudinal axis, said first exposed wire is rigidly attached to said upper surface of said base layer wherein said first end of said first exposed wire is adjacent to said first edge of said base layer and said second end of said first exposed wire is adjacent to said third edge of said base layer and said longitudinal axis of said first exposed wire is parallel with said longitudinal axis of said base layer, said first exposed wire further comprises: a first electrical connector and a second electrical connector, said first electrical connector is reversibly electromechanically connectable to said second electrical connector without any tools, said second electrical connector is reversibly electromechanically connectable to said first electrical connector without any tools, said first electrical connector is rigidly attached to said first end of said first exposed wire, and said second electrical connector is rigidly attached to said second end of said first exposed wire, said first jumper wire or transfer wire and said second jumper wire or transfer wire are each an electrical wire with: a first end, a second end, a length, and an outer diameter, said first jumper wire or transfer wire and said second jumper wire or transfer wire each have a first electrical connector attached to said first end, said first jumper wire or transfer wire and said second jumper wire or transfer wire each have a second electrical connector attached to said second end, said power supply unit is an electrical device that supplies electric power to an electrical load, said power supply unit has: a negative output terminal and a positive output terminal, said first one-wire special strip is attached to a house or building adjacent to a door or window, said second one-wire special strip is attached adjacent to said house or building adjacent to said door or window, said first electrical connector on said first jumper wire or transfer wire is electromechanically connected to said negative output terminal on said power supply unit, said first electrical connector on said second jumper wire or transfer wire is electromechanically connected to said positive output terminal on said power supply unit, said second electrical connector on said first jumper wire or transfer wire is electromechanically connected to said first electrical connector or said second electrical connector on said first one-wire special strip, said second electrical connector on said second jumper wire or transfer wire is electromechanically connected to said first electrical connector or said second electrical connector on said second one-wire special strip, and said power supply unit is connected to a power source.

2. A modular bear or other wild animal deterrent system for a house or building comprising: a first two-wire special strip; a first jumper wire or transfer wire; a second jumper wire or transfer wire; and a power supply unit, wherein, said first two-wire special strip comprises: a base layer; a first exposed wire; and a second exposed wire, wherein, said base layer is a rigid or semi-rigid planer member, said base layer has: a width, a length, a thickness, an upper surface, a lower surface, a first edge, a second edge, a third edge, a fourth edge, a plane, a latitudinal axis, and a longitudinal axis, said first exposed wire is a length of rigid wire or semi-rigid wire, said first exposed wire has a first end, a second end, a length, an outer diameter, and a longitudinal axis, said first exposed wire is rigidly attached to said upper surface of said base layer wherein said first end of said first exposed wire is adjacent to said first edge of said base layer and said second end of said first exposed wire is adjacent to said third edge of said base layer and said longitudinal axis of said first exposed wire is parallel with said longitudinal axis of said base layer, said first exposed wire further comprises: a first electrical connector and a second electrical connector, said first electrical connector is reversibly electromechanically connectable to said second electrical connector without any tools, said second electrical connector is reversibly electromechanically connectable to said first electrical connector without any tools, said first electrical connector is rigidly attached to said first end of said first exposed wire, and said second electrical connector is rigidly attached to said second end of said first exposed wire, said second exposed wire is a length of rigid wire or semi-rigid wire, said second exposed wire has a first end, a second end, a length, an outer diameter, and a longitudinal axis, said second exposed wire is rigidly attached to said upper surface of said base layer wherein said first end of said second exposed wire is adjacent to said first edge of said base layer and said second end of said second exposed wire is adjacent to said third edge of said base layer and said longitudinal axis of said second exposed wire is parallel with said longitudinal axis of said base layer, and said second exposed wire further comprises: a first electrical connector and a second electrical connector, said first electrical connector is reversibly electromechanically connectable to said second electrical connector without any tools, said second electrical connector is reversibly electromechanically connectable to said first electrical connector without any tools, said first electrical connector is rigidly attached to said first end of said second exposed wire, and said second electrical connector is rigidly attached to said second end of said second exposed wire, said first jumper wire or transfer wire and said second jumper wire or transfer wire are each an electrical wire with: a first end, a second end, a length, and an outer diameter, said first jumper wire or transfer wire and said second jumper wire or transfer wire each have a first electrical connector attached to said first end, said first jumper wire or transfer wire and said second jumper wire or transfer wire each have a second electrical connector attached to said second end, said power supply unit is an electrical device that supplies electric power to an electrical load, said power supply unit has: a negative output terminal and a positive output terminal, said first two-wire special strip is attached to a house or building, adjacent to a door or window, said first electrical connector on said first jumper wire or transfer wire is electromechanically connected to said negative output terminal on said power supply unit, said first electrical connector on said second jumper wire or transfer wire is electromechanically connected to said positive output terminal on said power supply unit, said second electrical connector on said first jumper wire or transfer wire is electromechanically connected to said first electrical connector or said second electrical connector on said first exposed wire on said first two-wire special strip, said second electrical connector on said second jumper wire or transfer wire is electromechanically connected to said first electrical connector or said second electrical connector on said second exposed wire on said first two-wire special strip, and said power supply unit is connected to a power source.

3. A modular bear or other wild animal deterrent system for a house or building comprising: a first one-wire special strip; a second one-wire special strip; a first two-wire special strip; a first jumper wire or transfer wire; a second jumper wire or transfer wire; a third jumper wire or transfer wire; a fourth jumper wire or transfer wire; and a power supply unit, wherein, said first one-wire special strip and said second one-wire special strip each comprise: a base layer and a first exposed wire, wherein, said base layer is a rigid or semi-rigid planer member, said base layer has: a width, a length, a thickness, an upper surface, a lower surface, a first edge, a second edge, a third edge, a fourth edge, a plane, a latitudinal axis, and a longitudinal axis, said first exposed wire is a length of rigid wire or semi-rigid wire, said first exposed wire has a first end, a second end, a length, an outer diameter, and a longitudinal axis, said first exposed wire is rigidly attached to said upper surface of said base layer wherein said first end of said first exposed wire is adjacent to said first edge of said base layer and said second end of said first exposed wire is adjacent to said third edge of said base layer and said longitudinal axis of said first exposed wire is parallel with said longitudinal axis of said base layer, said first exposed wire further comprises: a first electrical connector and a second electrical connector, said first electrical connector is reversibly electromechanically connectable to said second electrical connector without any tools, said second electrical connector is reversibly electromechanically connectable to said first electrical connector without any tools, said first electrical connector is rigidly attached to said first end of said first exposed wire, and said second electrical connector is rigidly attached to said second end of said first exposed wire, said first two-wire special strip comprises: a base layer; a first exposed wire; and a second exposed wire, wherein, said base layer is a rigid or semi-rigid planer member, said base layer has: a width, a length, a thickness, an upper surface, a lower surface, a first edge, a second edge, a third edge, a fourth edge, a plane, a latitudinal axis, and a longitudinal axis, said first exposed wire is a length of rigid wire or semi-rigid wire, said first exposed wire has a first end, a second end, a length, an outer diameter, and a longitudinal axis, said first exposed wire is rigidly attached to said upper surface of said base layer wherein said first end of said first exposed wire is adjacent to said first edge of said base layer and said second end of said first exposed wire is adjacent to said third edge of said base layer and said longitudinal axis of said first exposed wire is parallel with said longitudinal axis of said base layer, said first exposed wire further comprises: a first electrical connector and a second electrical connector, said first electrical connector is reversibly electromechanically connectable to said second electrical connector without any tools, said second electrical connector is reversibly electromechanically connectable to said first electrical connector without any tools, said first electrical connector is rigidly attached to said first end of said first exposed wire, and said second electrical connector is rigidly attached to said second end of said first exposed wire, said second exposed wire is a length of rigid wire or semi-rigid wire, said second exposed wire has a first end, a second end, a length, an outer diameter, and a longitudinal axis, said second exposed wire is rigidly attached to said upper surface of said base layer wherein said first end of said second exposed wire is adjacent to said first edge of said base layer and said second end of said second exposed wire is adjacent to said third edge of said base layer and said longitudinal axis of said second exposed wire is parallel with said longitudinal axis of said base layer, and said second exposed wire further comprises: a first electrical connector and a second electrical connector, said first electrical connector is reversibly electromechanically connectable to said second electrical connector without any tools, said second electrical connector is reversibly electromechanically connectable to said first electrical connector without any tools, said first electrical connector is rigidly attached to said first end of said second exposed wire, and said second electrical connector is rigidly attached to said second end of said second exposed wire, said first jumper wire or transfer wire, said second jumper wire or transfer wire, said third jumper wire or transfer wire, and said fourth jumper wire or transfer wire are each an electrical wire with: a first end, a second end, a length, and an outer diameter, said first jumper wire or transfer wire, said second jumper wire or transfer wire, said third jumper wire or transfer wire, and said fourth jumper wire or transfer wire each have a first electrical connector attached to said first end, said first jumper wire or transfer wire, said second jumper wire or transfer wire, said third jumper wire or transfer wire, and said fourth jumper wire or transfer wire each have a second electrical connector attached to said second end, said power supply unit is an electrical device that supplies electric power to an electrical load, said power supply unit has: a negative output terminal and a positive output terminal, said first one-wire special strip is attached to a house or building, adjacent to a door or window, said second one-wire special strip is attached adjacent to said house or building, adjacent to said door or window, said first two-wire special strip is attached to said house or building, adjacent to said door or window, said first electrical connector on said first jumper wire or transfer wire is electromechanically connected to said negative output terminal on said power supply unit, said first electrical connector on said second jumper wire or transfer wire is electromechanically connected to said positive output terminal on said power supply unit, said second electrical connector on said first jumper wire or transfer wire is electromechanically connected to said first end of said first one-wire special strip or said first end of said first two-wire special strip, said second electrical connector on said second jumper wire or transfer wire is electromechanically connected to said first end of said second one-wire special strip or said first end of said first two-wire special strip, said first electrical connector on said third jumper wire or transfer wire is electromechanically connected to said second end of said first one-wire special strip or said second end of said first two-wire special strip, said first electrical connector on said fourth jumper wire or transfer wire is electromechanically connected to said second end of said second one-wire special strip or said second end of said first two-wire special strip, said second electrical connector on said third jumper wire or transfer wire is electromechanically connected to said first end of said first one-wire special strip or said first end of said first two-wire special strip, said second electrical connector on said fourth jumper wire or transfer wire is electromechanically connected to said first end of said second one-wire special strip or said first end of said first two-wire special strip, and said power supply unit is connected to a power source.

* * * * *